US009261178B2

(12) United States Patent
Yamamoto et al.

(10) Patent No.: US 9,261,178 B2
(45) Date of Patent: Feb. 16, 2016

(54) LINEAR DEVICE

(75) Inventors: Kazuhito Yamamoto, Fujisawa (JP);
Tsutomu Ookubo, Fujisawa (JP)

(73) Assignee: NSK LTD., Shinagawa-ku, Tokyo (JP)

( * ) Notice: Subject to any disclaimer, the term of this patent is extended or adjusted under 35 U.S.C. 154(b) by 0 days.

(21) Appl. No.: 13/581,200

(22) PCT Filed: Aug. 1, 2012

(86) PCT No.: PCT/JP2012/004898
§ 371 (c)(1),
(2), (4) Date: Jan. 15, 2014

(87) PCT Pub. No.: WO2014/020649
PCT Pub. Date: Feb. 6, 2014

(65) Prior Publication Data
US 2014/0116166 A1    May 1, 2014

(30) Foreign Application Priority Data

Jun. 7, 2011   (JP) ................................. 2011-127424

(51) Int. Cl.
*F16C 33/00*  (2006.01)
*F16C 33/10*  (2006.01)
(Continued)

(52) U.S. Cl.
CPC ........ *F16H 25/2204* (2013.01); *F16H 25/2418* (2013.01); *Y10T 74/18712* (2015.01)

(58) Field of Classification Search
CPC ............. F16H 25/2204; F16H 25/2418; F16C 29/084; F16C 29/088; F16C 29/0688
USPC ............. 384/13, 15, 16, 43–50, 54; 74/89.23, 74/89.32, 89.33, 89.4, 89.44, 424.81, 74/424.82; 277/410–412, 417, 418, 551, 277/560
See application file for complete search history.

(56) References Cited

U.S. PATENT DOCUMENTS 6,176,149 B1 *   1/2001   Misu ......................... 74/424.82
7,089,819 B2 *   8/2006   Yabe et al. ..................... 74/89.4
(Continued)

FOREIGN PATENT DOCUMENTS

JP        9-217745 A      8/1997
JP     2000-161462 A      6/2000
(Continued)

OTHER PUBLICATIONS

English translation of document C1 (International Search Report (PCT/ISA/210)) previously filed on Nov. 27, 2012 (two (2) pages).
(Continued)

*Primary Examiner* — Adam D Rogers
(74) *Attorney, Agent, or Firm* — Crowell & Moring LLP (57) ABSTRACT

A linear device is provided which can greatly reduce an amount of leakage of fine particles that are produced between a rolling element raceway and rolling elements to the outside of the device and which is therefore suitable for a semiconductor production apparatus or liquid crystal display panel production apparatus or other clean environment. In a linear device, each of a pair of seal members is formed to a shape which has a clearance of 0.025 to 0.15 mm in range with respect to a raceway member when cut along a direction perpendicular to the axial direction of the raceway member in a state attached to a moving member. Grease with a worked penetration of 175 to 250 is coated between the rolling element raceway and the rolling elements.

2 Claims, 8 Drawing Sheets

(51) Int. Cl.
   *F16C 29/06*   (2006.01)
   *F01D 11/02*   (2006.01)
   *F16H 25/22*   (2006.01)
   *F16H 25/24*   (2006.01)

(56) References Cited

U.S. PATENT DOCUMENTS

| | | | |
|---|---|---|---|
| 8,033,729 | B2 | 10/2011 | Michioka et al. |
| 8,070,360 | B2 * | 12/2011 | Michioka et al. ............... 384/13 |
| 8,113,714 | B2 * | 2/2012 | Ogura et al. ................... 384/13 |
| 2004/0016312 | A1 | 1/2004 | Yabe et al. |
| 2007/0154124 | A1 | 7/2007 | Inoue et al. |
| 2007/0205562 | A1 * | 9/2007 | Chien ............................ 277/551 |
| 2012/0240706 | A1 * | 9/2012 | Ohkubo et al. ............ 74/424.83 |
| 2014/0167363 | A1 * | 6/2014 | Oka ............................... 277/402 |

FOREIGN PATENT DOCUMENTS

| | | |
|---|---|---|
| JP | 2000-179640 A | 6/2000 |
| JP | 2000-230619 A | 8/2000 |
| JP | 2003-343686 A | 12/2003 |
| JP | 2006-112517 A | 4/2006 |
| JP | 2007-100760 A | 4/2007 |
| JP | 2010-169114 A | 8/2010 |
| JP | 2011-190928 A | 9/2011 |
| JP | 2011-247404 A | 12/2011 |
| WO | WO 2005/078298 A1 | 8/2005 |
| WO | WO 2006/054439 A1 | 5/2006 |

OTHER PUBLICATIONS

Japanese language International Search Report (PCT/ISA/210) dated Aug. 28, 2012 (three (3) pages).
Japanese language Written Opinion (PCT/ISA/237) dated Aug. 28, 2012 (five (5) pages).
PCT/JP2012/004898, PCT/IB/338 dated Feb. 12, 2015 (One (1) page).
PCT/JP2012/004898, International Preliminary Report on Patentability (PCT/IB/373) dated Feb. 3, 2015, enclosing English Translation of Written Opinion of the International Searching Authority (PCT/ISA/237)(Seven (7) pages).
Japanese Office Action dated Mar. 17, 2015, with partial English translation (Six (6) pages).
Chinese Office Action issued in counterpart Chinese Application No. 201280000747.6 dated Oct. 10, 2015, with partial English translation (Eight (8) pages).

* cited by examiner

Prior Art

FIG. 8

Prior Art

FIG. 9

Prior Art

LINEAR DEVICE

TECHNICAL FIELD

The present invention relates to a ball screw or ball spline or linear guide or other linear device which is used in a semiconductor production apparatus, liquid crystal display panel production apparatus, or other clean environment.

BACKGROUND ART

A semiconductor wafer or a liquid crystal display panel is a super precision part, so becomes defective due to extremely fine dust etc. For this reason, a production line of a wafer or liquid crystal display panel or the inside of apparatuses of the production line are spaces of high cleanliness. In this regard, the drive parts of semiconductor production apparatuses, liquid crystal display panel production apparatuses, etc. make use of large numbers of ball screws, linear guides, and other linear devices.

Such a ball screw, linear guide, or other linear device is provided with a raceway member which has a rolling element rolling part on its outer circumferential surface, a moving member which has a load rolling element rolling part which faces the rolling element rolling part on its inner circumferential surface and which can move relative to the raceway member, a plurality of rolling elements which are loaded rollably inside of a rolling element raceway which is formed by the rolling element rolling part and the load rolling element rolling part, and a rolling element recirculation path which connects a starting point and end point of the rolling element raceway to form an endless rolling element passage.

Explaining this using a ball screw as an example, the raceway member is constituted by a threaded shaft, the moving member is constituted by a nut, and the rolling elements are constituted by balls. A ball screw is provided with a threaded shaft which has a spiral ball rolling groove (rolling element rolling part) at its outer circumferential surface, a nut which has a load ball rolling groove (load rolling element rolling part) which faces the ball rolling groove (rolling element rolling part) of the threaded shaft, and a plurality of balls which are loaded rotably inside a spiral ball raceway (rolling element raceway) which is formed by the ball rolling groove (rolling element rolling part) and the load ball rolling groove (load rolling element rolling part). Further, if making the nut which is screwed to the threaded shaft and the threaded shaft rotate and move relative to each other through the balls, the threaded shaft and nut move relative to each other in the axial direction through the rolling action of the balls. Further, the ball screw is provided with a ball recirculation path (rolling element recirculation path) which connects a starting point and end point of the ball raceway to form an endless ball passage (rolling element passage).

In this regard, in this ball screw, when the nut and the threaded shaft rotate relative to each other, the balls roll while sliding upon receiving the composite force in the rotating direction and the axial direction, so at the contact parts of the balls and ball raceway, rolling friction and sliding friction simultaneously occur. Further, if the balls contact each other, the directions of rotation of the adjoining balls become opposite to each other, so the relative slip speed between the balls doubles and large frictional force is caused. For this reason, the practice has been to coat grease, oil, or another lubricant between the ball raceway and the rolling elements so as to try to lighten the frictional force.

Here, the rolling motion of the rolling elements causes the oil ingredient in the grease which is coated between the ball raceway and the rolling elements to form fine particles which splatter. This splattered fine particles becomes a cause of defects in the wafer, liquid crystal display panel, or other finished product. For this reason, in the case of semiconductor production apparatuses, liquid crystal display panel production apparatuses, and other cases where cleanliness is required, clean grease, vacuum grease (fluid lubricant), solid lubricants, etc. are used. Due to this, the amount of fine particles (oil ingredient) which is produced from the lubricant and the contact parts of balls with other balls is suppressed.

However, in recent years, in the semiconductor field, higher throughput (higher productivity) by higher speed conveyance and further cleanliness have been increasingly demanded. Even if employing the current means of using clean grease, vacuum grease, solid lubricants, and the like to suppress the production of such fine particles, the amount of suppression has been becoming insufficient. That is, in recent years, in the semiconductor field, advances have been made in higher integration, so the conductor patterns have become increasingly finer. The deposition of fine particles on the semiconductor wafer or liquid crystal display panel in the previous steps (in the process of product ion of semiconductors, the steps from the cutting of the silicon to fabricate the wafer to the formation of the circuits in the wafer and inspection of the conductive patterns of the circuits) causes problems in the products and is being increasingly averred. Furthermore, in addition to the higher integration, measures to deal with the increase in the amount of fine particles accompanying the higher speed of wafer conveyance systems aimed at improvement of the throughput (productivity) have become essential.

Figure 7:
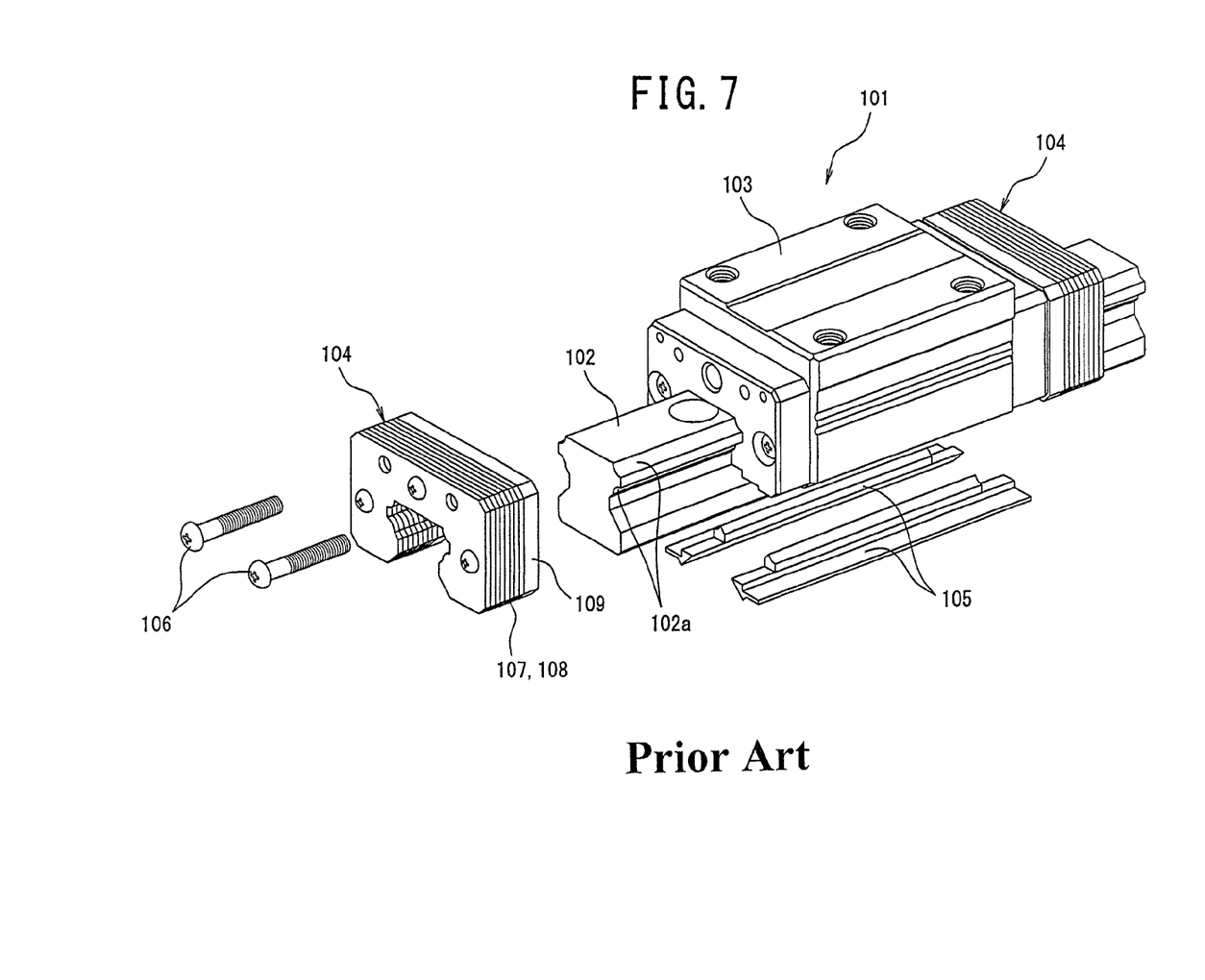
FIG. 7 is a disassembled perspective view which shows a linear guide which is used in a vacuum environment of the prior art.

Here, as a linear guide which is used in a vacuum environment in the past, for example, the one which is shown in FIG. 7 is known (see Patent Document 1).

The linear guide 101 which is shown in FIG. 7 is provided with a raceway member 102 which has rolling element rolling parts 102a, a moving member 103 which has rolling element recirculation paths which include load rolling element rolling parts (not shown) which face the rolling element rolling parts 102a and can move relative to the raceway member 102, a plurality of rolling elements (not shown) which are arranged in the rolling element recirculation paths, and clearance seals 104 and 105 which are provided at the moving member 103 and close the clearance between the raceway member 102 and the moving member 103 without contacting the raceway member 102. The clearance seals 104 are attached by mounting screws 106 to the end parts of the moving member 103 in the axial direction.

Figure 8:
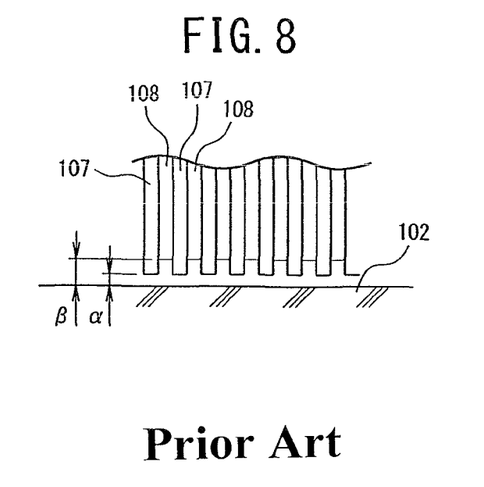
FIG. 8 is a view which shows the state of clearance between the seal members and raceway member in the linear guide which is shown in FIG. 7.

Further, each of the clearance seals 104 which are attached to the end parts of the moving member 103 in the axial direction is comprised of a plurality of alternately stacked thin first and second plates 107 and 108 and a holding plate 109 to which these first and second plates 107 and 108 are attached. The first and second plates 107 and 108 which form that clearance seal 104 move along the guide rail raceway member 102 while maintaining a slight clearance without contacting the raceway member 102. Explaining this clearance, as shown in FIG. 8, the clearance β between the second plate 108 and the raceway member 102 forms a uneven shape which is larger than the clearance α between the first plate 107 and the raceway member 102. By making the clearance between the clearance seal 104 and the raceway member 102 a uneven shape, when lubricating oil evaporates and the gas flows between the clearance seal 104 and the raceway member 102, a large resistance is caused compared with the case of forming the clearance by a flat shape and the lubricant inside of the linear guide device can be better kept from vaporizing and leaking to the outside of the linear guide.

Figure 9:
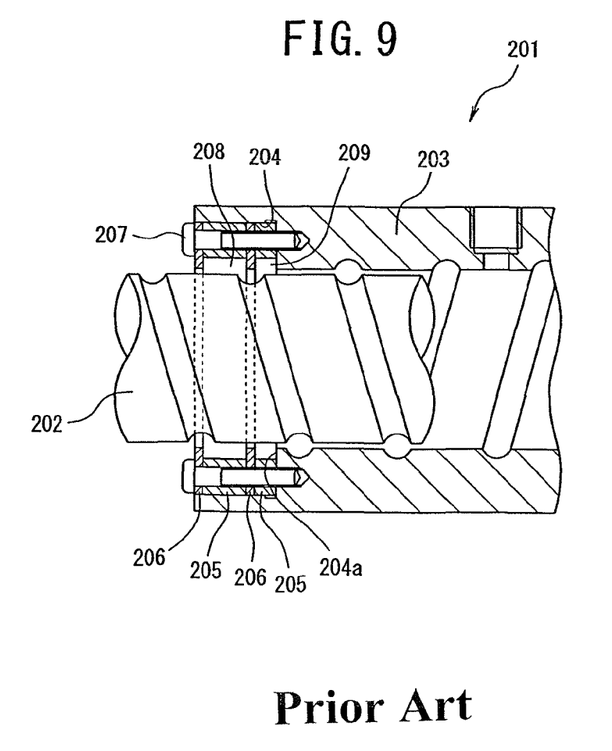
FIG. 9 is a cross-sectional view which shows a conventional ball screw which is able to be used in a clean environment.

Further, in the past, as a ball screw which can be used in a clean environment, for example, the one which is shown in FIG. 9, has been known (see Patent Document 2).

In the ball screw 201 which is shown in FIG. 9, inside a concave part 204 of a nut 203, in the order from the inside in the axial direction, a ring-shaped space 205, a non-contact seal 206, a ring-shaped space 205, and a non-contact seal 206 are arranged. These are fastened by bolts 207 to the end face 204a of the concave part 204. Due to this, a space 208 which is surrounded by the adjoining non-contact seal 206 and spacer 205 and the threaded shaft 202 and a space 209 which is surrounded by the inside non-contact seal 206 and spacer 205 and the end face 204a of the concave part 204 are formed. These spaces 208 and 209 become grease pooling spaces.

In this way, an outside seal which is arranged at the outer most side of the nut 203 in the axial direction is made a non-contact seal 206 and grease pooling spaces 208 and 209 are provided, so compared with the case of making the outside seal a contact seal and providing grease pooling spaces, the production of dust due to wear of the contact seal is reduced. Further, compared with the case of making the outside seal a non-contact seal and not providing grease pooling spaces, the production of dust due to splattering of grease is reduced and the lubricating performance also becomes excellent.

CITATIONS LIST

Patent Documents

Patent Document 1: WO2006/054439
Patent Document 2: JP 2010-169114 A

SUMMARY OF INVENTION

Problem to be Solved

However, the linear guide 101 which is shown in FIG. 7 and the ball screw 201 which is shown in FIG. 9 had the following problems:

That is, in the case of the linear guide 101 which is shown in FIG. 7, in the state with a clearance seal 104 attached to the moving member 103, it is considered that the clearance α between the first plate 107 and the raceway member 102 which is shown in FIG. 8 is set to not more than 0.25 mm at the position where the first plate 107 approaches the raceway member 102 the most. Further, the smaller the clearance α, the larger the resistance when gas flows through the passage, so it has been considered preferable to set the target value of the clearance α to 0.05 to 0.06 mm or so or less.

However, the particle size of fine particles which may be conceived of in the semiconductor field is on the order of sub microns, so the amount of clearance of 0.25 mm is extremely large. Further, the target value of the clearance α is preferably set to 0.05 to 0.06 mm or so or less, but if actually setting the clearance between the seals alone and raceway member to 0.05 mm or less, depending on the attachment of the seal members (in particular in the case of a ball screw), there is a high possibility of the seal members contacting the raceway member. If the seal members touch the raceway member, conversely there is the problem that this will cause the production of fine particles. Therefore, if considering the tolerance in working the moving member and the seal members, in actuality, the clearance between the seal members and the raceway member becomes 0.05 mm or more and therefore there is a possibility of the fine particles which may be conceived of in the semiconductor field ending up being leaked to the outside.

Further, in the case of the ball screw 201 which is shown in FIG. 9, how much the amount of clearance is between the non-contact seal 206 and the threaded shaft is not clearly indicated. For this reason, even if providing the grease pooling spaces 208 and 209, there is a possibility of the fine particles which may be conceived of in the semiconductor field ending up being leaked to the outside.

Therefore, the present invention was made in consideration of the above problem points and has as its object the provision of a linear device which is suitable for a semiconductor production apparatus or liquid crystal display panel production apparatus or other clean environment which can greatly keep the amount of fine particles which were produced between the rolling element raceway and rolling elements from being leaked outside of the device.

Solution to the Problem

To solve the above problem, the linear device according to one aspect of the present invention is a linear device which is provided with a raceway member which extends in the axial direction and which has a rolling element rolling part at its outer circumferential surface, a moving member which has a load rolling element rolling part which faces the rolling element rolling part at its inner circumferential surface and which can move relative to the raceway member, a plurality of rolling elements which are loaded rollably inside a rolling element raceway which is formed by the rolling element rolling part and the load rolling element rolling part, a rolling element recirculation path which connects a starting point and end point of the rolling element raceway to form an endless rolling element passage, and a pair of seal members which are attached to the two ends of the moving member in the axial direction, the linear device characterized in that each of the pair of seal members is formed to a shape having a clearance of 0.025 to 0.15 mm with respect to the raceway member when cut along the direction perpendicular to the axial direction of the raceway member in the state attached to the moving member and in that grease with a worked penetration of 175 to 250 is coated between the rolling element raceway and the rolling elements.

Further, in this linear device, each of the pair of seal members along the axial direction of the raceway member preferably has a thickness of 0.1 mm to less than 1.2 mm.

Furthermore, in this linear device, the material of the pair of seal members may be made a resin material or a metal material.

In addition, in this linear device, each of the pair of seal member may be comprised of a plurality of seal members, and the plurality of seal members may be arranged along an axial direction of the moving member at a pitch giving a clearance of at least a thickness of each seal member.

Advantageous Effects of the Invention

According to the linear device according to the present invention, each of the pair of seal members is formed into a shape having a clearance of 0.025 to 0.15 mm with respect to the raceway member when cut along the direction perpendicular to the axial direction of the raceway member in the state attached to the moving member. Grease with a worked penetration of 175 to 250 is coated between the rolling element raceway and the rolling elements, so if the moving member and the raceway member rotate relative to each other through the rolling elements, a hard grease layer (seal film) is formed between the raceway member and the seal members. For this reason, compared with the case of provision of clearance with respect to the raceway member by the seal members alone, the clearance between the seal members and the raceway member becomes extremely small, the fine particles which are produced between the rolling element raceway and the rolling elements can be sealed inside of the moving member, and the fine particles which is produced between the rolling element raceway and the rolling elements can be kept to a minimum. For this reason, it is possible to provide a linear device which is suitable for a semiconductor production apparatus, liquid crystal display panel production apparatus, or other clean environment.

If using a grease with a worked penetration larger than 250, the grease will be soft and a grease layer (seal film) will be hard to form between the raceway member and the seal members. For this reason, grease with a worked penetration of 250 or less is used. On the other hand, if using a grease with a worked penetration smaller than 175, the grease ends up becoming to hard and a grease layer (seal film) is hard to form between the raceway member and the seal member. For this reason, grease with a worked penetration of 175 or more is used.

Further, if using grease which has a worked penetration of 175 to 250, the amount of the fine particles which leak outside of the device while the clearance between the seal members and the raceway member is from 0 to 0.025 mm decreases. The amount of the fine particles which leaks outside of the device up to when the clearance is 0.025 mm to 0.15 mm remains substantially unchanged. If the clearance becomes larger than 0.15 mm, the amount of the fine particles which leaks outside of the device increases substantially proportionally to the increase in the amount of clearance. For this reason, each of the seal members is formed to a shape which has a clearance of 0.025 to 0.15 mm in range with respect to the raceway member when cut by a plane which is perpendicular to the axial direction of the raceway member in the state of attachment to the moving member. Note that, if the clearance between the seal members and the raceway member is smaller than 0.025 mm, if considering the precision of working and precision of assembly of the seal members etc., there is a high possibility of the seal members contacting the raceway member. If the seal members contact the raceway member, this is liable to end up causing fine particles to be produced.

Further, in this linear device, if the thickness of the pair of seal members along the axial direction of the raceway member is 0.1 mm to less than 1.2 mm, when making the linear device a ball screw and making the raceway member a threaded shaft, it is possible to maintain the clearance between the seal members and the groove bottom of the threaded shaft at a suitable magnitude. Working of the seal members is easy, suitable rigidity can be secured, and the sealing ability is also stable. That is, if the thickness of the seal members is greater than 1.2 mm, the clearance between the seal members and the groove bottom of the threaded shaft ends up becoming larger than 0.15 mm. On the other hand, if the thickness of the seal members is less than 0.1 mm, the seal members become difficult to work, the rigidity ends up falling, and the sealing ability becomes unstable.

Furthermore, in this linear device, if the pair of the seal members are made of a resin material or a metal material, it is suitable to suitably select the resin material or metal material while considering the mechanical strength, heat resistance, wear resistance, chemical resistance, machineability, and costs.

Further, in this linear device, if each of the pair of seal members is comprised of a plurality of seal members and that plurality of seal members are arranged along the axial direction of the moving member at a pitch giving a clearance of at least the thickness of each seal member, the amount of the fine particles which are produced between the rolling element raceway and the rolling elements and which leak to outside of the device can be suppressed more.

BRIEF DESCRIPTION OF THE DRAWINGS

FIG. 5 shows differences in clearance between the seal members and raceway member due to differences in thickness of the seal members, wherein (A) is a schematic view of the case where the seal members are thick and (B) is a schematic view in the case where the seal members are thin.

FIG. 6 shows a method of attachment of the seal members, wherein (A) is a cross-sectional view of the case of attaching the seal members by circlips to a moving member and (B) is a cross-sectional view of the case of attaching the seal members by setscrews to a moving member.

DESCRIPTION OF EMBODIMENTS

Figure 1:
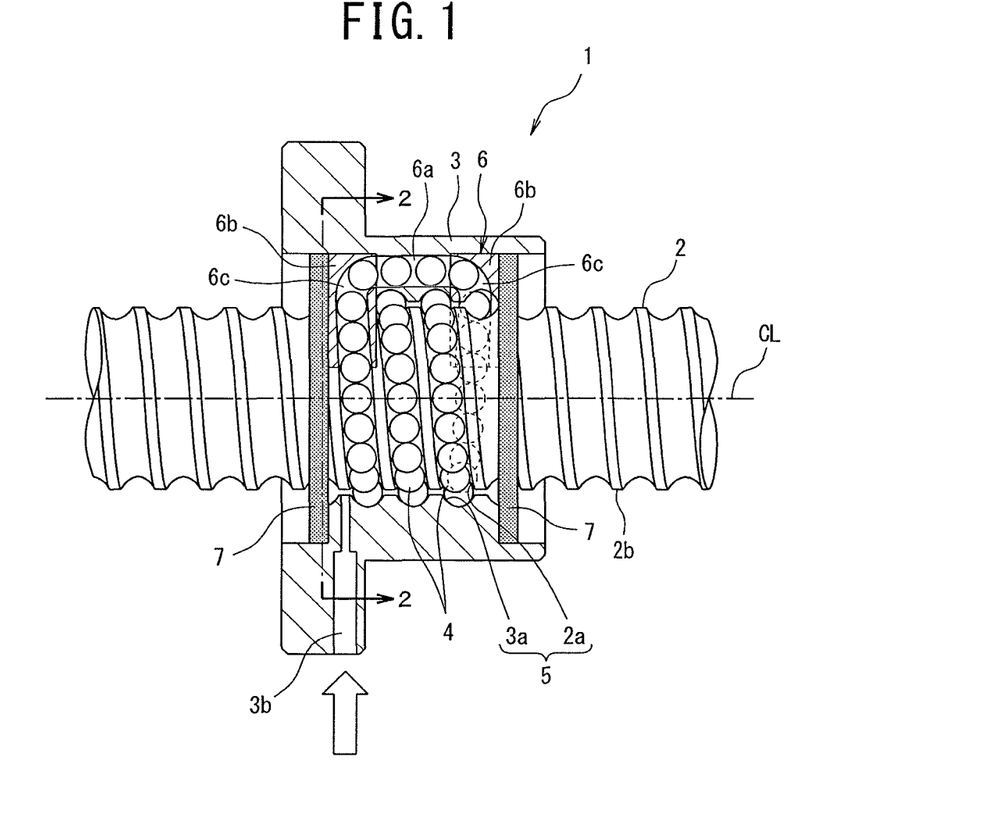
FIG. 1 is a cross-sectional view which is cut along an axial direction of a raceway member which shows an embodiment of a linear device according to the present invention.
Figure 2:
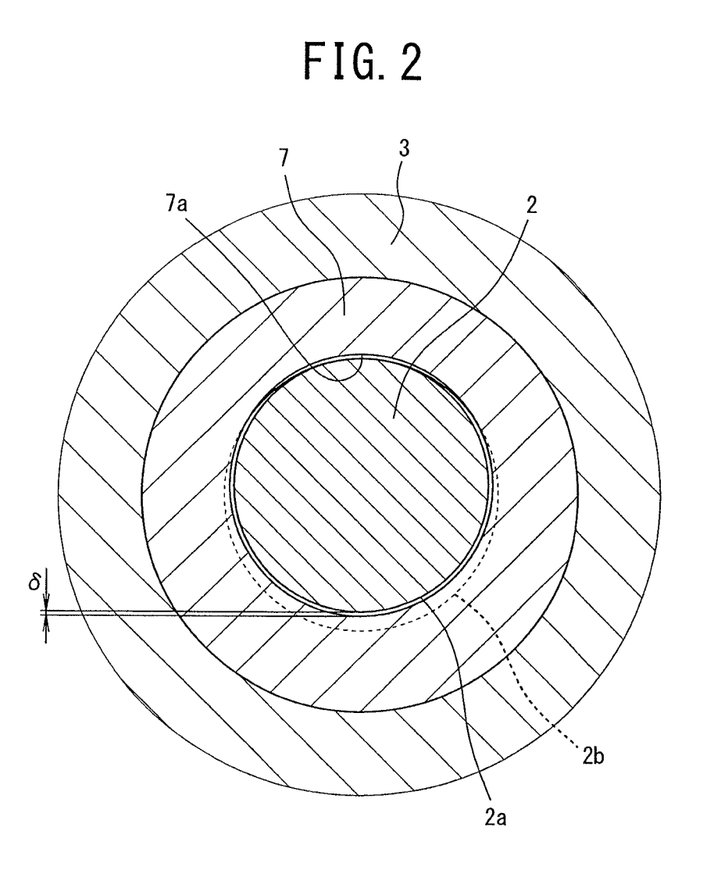
FIG. 2 is a cross-sectional view of a state which is cut along a line 2-2 in FIG. 1 (cut along direction perpendicular to axial direction of raceway member).
Figure 3:
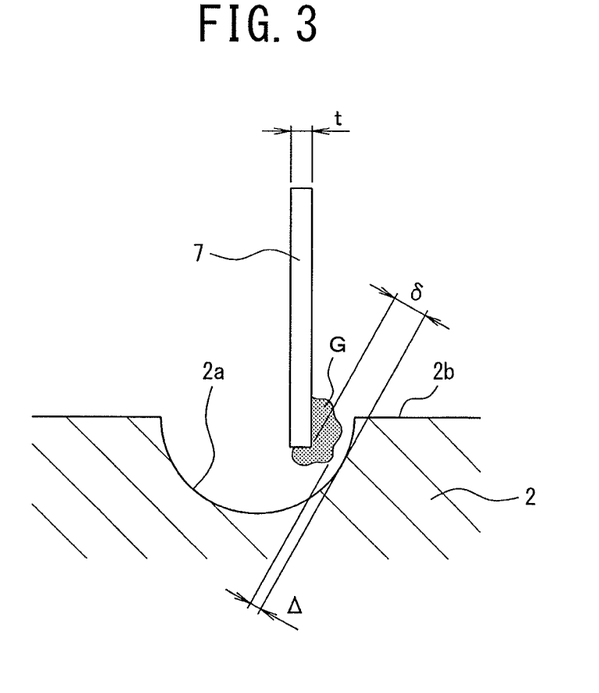
FIG. 3 is a view which schematically shows a vicinity of clearance between seal members and a raceway member.

Below, embodiments of the present invention will be explained with reference to the drawings. FIG. 1 is a cross-sectional view which is cut along an axial direction of a raceway member which shows an embodiment of a linear device according to the present invention. FIG. 2 is a cross-sectional view of a state which is cut along a line 2-2 in FIG. 1 (cut along direction perpendicular to axial direction of raceway member). FIG. 3 is a view which schematically shows a vicinity of clearance between seal members and a raceway member.

The linear device 1 which is shown in FIG. 1 is a ball screw which is suitable for a semiconductor production apparatus, a liquid crystal display panel production apparatus, or other clean environment and is provided with a raceway member (threaded shaft) 2, a moving member (nut) 3, and a plurality of rolling elements (balls) 4.

The raceway member 2 has a cylindrical shape which extends along the centerline CL in the axial direction and is formed at its outer circumferential surface 2b with a rolling element rolling part (rolling element rolling groove) 2a which has predetermined leads. The groove bottom of the rolling element rolling part (rolling element rolling groove) 2a is preferably not provided with a relief part.

The moving member 3 forms a substantially cylindrical shape with an inside diameter formed larger than the outside diameter of the raceway member 2. It is inserted over the raceway member 2 with a predetermined clearance. The inner circumferential surface of the moving member 3 has a lead which is equal to the rolling element rolling part 2a of the raceway member 2. A load rolling element rolling part (load rolling element rolling groove) 3a which faces the rolling element rolling part 2a is formed. Further, the rolling element rolling part 2a of the raceway member 2 and the load rolling element rolling part 3a of the moving member 3 are used to form the cross-sectional circular shaped rolling element raceway 5. This rolling element raceway 5 has a plurality of rolling elements 4 loaded and arranged inside it in a rollable manner. The moving member 3 is provided with a greasing hole 3b for greasing the rolling element raceway 5.

Further, the linear device 1 has a rolling element recirculation path 6 which connects a starting point and endpoint of the rolling element raceway 5 to form an endless rolling element passage. This rolling element recirculation path 6 is comprised of a recirculation path 6a of a cross-sectional circular shape which is formed inside of the moving member and which extends along the axial direction in a line, a passage 6c which is formed with a scooping member 6b which is provided at one end of the recirculation path 6a in the axial direction, and a passage 6c which is formed at a scooping member 6b which is provided at the other end of the recirculation path 6a in the axial direction. The passage 6c which is formed at the scooping member 6b which is provided at one end of the recirculation path 6a in the axial direction is connected to the starting point of the rolling element raceway 5, while the passage 6c which is formed at a scoop up member 6b which is provided at the other end of the recirculation path 6a in the axial direction is connected to the end point of the rolling element raceway 5. Due to this rolling element recirculation path 6, rolling elements 4 which roll toward the end point of the rolling element raceway 5 are scooped up in the radial direction of the raceway member 2, furthermore, ride over the thread of the raceway member 2, and return to the starting point of the rolling element raceway 5 to thereby enable recirculation of the rolling elements 4. Further, this rolling element raceway 5 and rolling element recirculation path 6 are used to form the substantially endless recirculation path of the raceway member 2. Due to this, along with relative rotation of the raceway member 2 with respect to the moving member 3, the plurality of rolling elements 4 recirculate through the inside of the endless recirculation path whereby the moving member 3 can move linearly with respect to the raceway member 2 in the axial direction of the raceway member 2.

Further, the two ends of the moving member 3 in the axial direction have a pair of seal members 7 attached to them. This pair of seal members 7 are used to prevent emission of dust from the inside of the moving member 3. In particular, fine particles of the linear device 1 are produced between the rolling elements 4 and the rolling element raceway 5 by the lubricant (grease or oil) being stirred up by the friction when the rolling elements 4 rotate. How the fine particles inside of the moving member 3 are sealed inside of the moving member 3 is essential for improvement of the cleanliness. In particular, this is important in a linear device which is used for a semiconductor production apparatus, liquid crystal display panel production apparatus, or other clean environment.

Here, each seal member 7 is comprised of a single seal member. As shown in FIG. 2, it is formed to a shape having a clearance $\delta$ of 0.025 to 0.15 mm in range with respect to the raceway member 2 when cut along a direction perpendicular to the axial direction of the raceway member 2 in the state attached to the moving member 3. That is, each seal member 7 is formed into a ring shape and has a through hole 7a inside it through which the raceway member 2 passes. This through hole 7a is formed to a shape having a clearance $\delta$ of 0.025 to 0.15 mm in range with respect to the raceway member 2 when cut along a direction perpendicular to the axial direction of the raceway member 2 in the state attached to the moving member 3.

Here, the clearance $\delta$, as shown in FIG. 3, means the geometrically smallest distance in the distance from the raceway member 2 (in the case of FIG. 3, the groove surface of the rolling element rolling part 2a of the raceway member 2) to one of the corner parts of the front end of the seal member 7.

In this way, the clearance $\delta$ between the seal members 7 and the raceway member 2 is at least 0.025 mm, so the seal members 7 will not contact the raceway member 2 and fine particles will not be produced from the seal members 7 themselves. If the clearance $\delta$ between the seal members 7 and the raceway member 2 is smaller than 0.025 mm, if considering the precision of working or the precision of assembly of the seal members 7 etc., there is a high possibility of the seal members 7 contacting the raceway member 2. If the seal members 7 contact the raceway member 2, fine particles are liable to be produced by this.

Further, in the linear device 1, grease with a worked penetration of 175 to 250 is coated between the rolling element raceway 5 and the rolling elements 4. For this grease, for example, clean grease or vacuum grease is suitably used. If coating grease with a worked penetration of 175 to 250 between the rolling element raceway 5 and the rolling elements 4 in this way, when the moving member 3 and the raceway member 2 rotate relative to each other through the rolling elements 4, as shown in FIG. 3, a hard grease layer (seal film) G is formed between the raceway member 2 and the seal members 7. Due to this, compared with use of the seal members 7 alone to provide a clearance $\delta$ with respect to the raceway member 2, the clearance between the seal members 7 and the raceway member 2 becomes smaller by exactly the amount of the grease layer G as shown in FIG. 3 and becomes $\Delta$. Due to this, it is possible to seal the fine particles which are produced between the rolling element raceway 5 and the rolling elements 4 inside of the moving member 3 and possible to greatly suppress the amount of fine particles which are produced between the rolling element raceway 5 and the rolling elements 4 which leak to the outside of the device. For this reason, it is possible to provide a linear device 1 which is suitable for a semiconductor production apparatus, liquid crystal display panel production apparatus, or other clean environment.

If using grease with a worked penetration of larger than 250, the grease will be soft and a grease layer (seal film) G will be hard to form between the raceway member 2 and the seal members 7. For this reason, grease with a worked penetration of 250 or less is used. On the other hand, if using grease with a worked penetration of smaller than 175, the grease will end up being too hard and a grease layer (seal film) will be hard to form between the raceway member and the seal members. For this reason, grease with a worked penetration of 175 or more is used.

Figure 4:
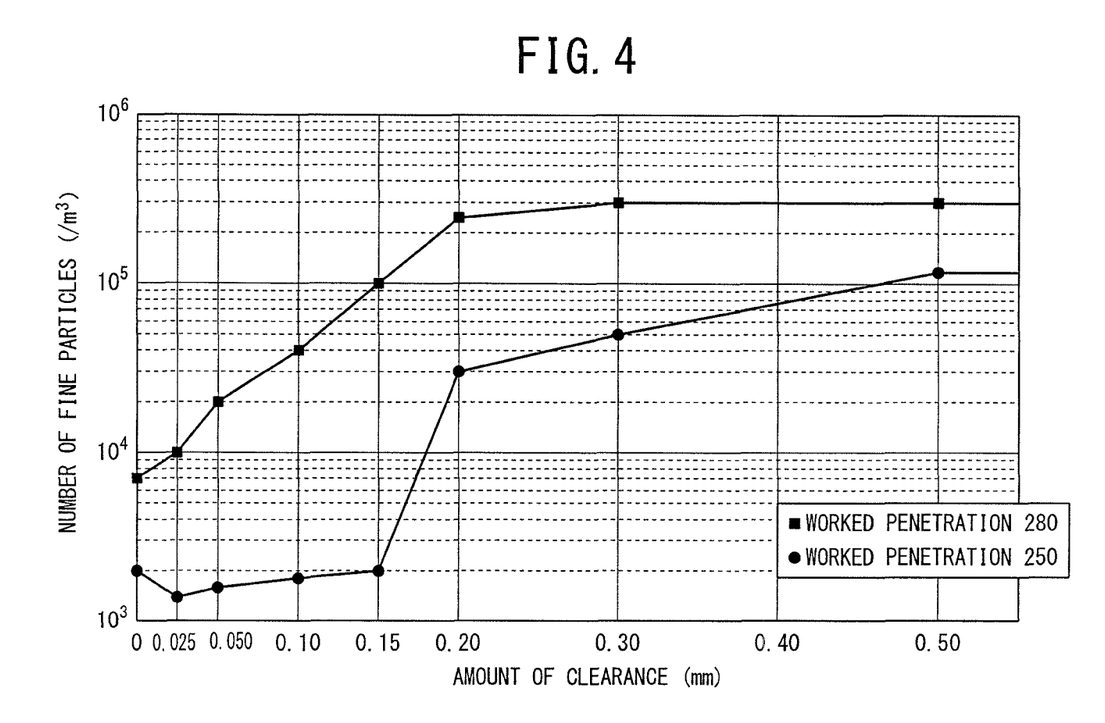
FIG. 4 is a graph which shows a relationship between an amount of clearance between seal members and the raceway member and an amount of fine particles which to outside of a device.

Next, the relationship between the amount of clearance $\delta$ between the seal members 7 and the raceway member 2 and the amount of the fine particles which leak to the outside of the device will be explained with reference to FIG. 4. FIG. 4 is a graph which shows the relationship between the amount of clearance between the seal members and the raceway member and the amount of the fine particles which leak to the outside of the device.

FIG. 4 shows the relationship between the amount of clearance and the amount of fine particles which leak to the outside of the device in the case of using grease of a worked penetration of 280 and making the amount of clearance 0 mm, 0.025 mm, 0.050 mm, 0.10 mm, 0.15 mm, 0.20 mm, 0.30 mm, and 0.50 mm and the case of using grease of a worked penetration of 250 and making the amount of clearance 0 mm, 0.025 mm, 0.050 mm, 0.10 mm, 0.15 mm, 0.20 mm, 0.30 mm, and 0.50 mm.

Referring to FIG. 4, with grease of a worked penetration of 280, the amount of fine particles which leak to the outside of the device is larger than grease of a worked penetration of 250. If increasing the amount of clearance, the amount of the fine particles proportionally increases. As opposed to this, with grease of a worked penetration of 250, the amount of the fine particles which leak to the outside of the device decreases from an amount of clearance of 0 to 0.025 mm. In a state of the clearance of 0.025 mm to 0.15 mm, the amount of the fine particles which leak to the outside of the device does not substantially fluctuate. If the clearance becomes larger than 0.15 mm, in the same way as grease with a worked penetration of 280, the amount of the fine particles which leak to the outside of the device increases substantially proportionally to the increase in the amount of clearance. Regarding this trend, similar results are obtained not only with grease with a worked penetration of 250, but also when using grease with a worked penetration of 175 to 250. For this reason, each of the seal members 7 was formed into a shape with has a clearance $\delta$ of 0.025 to 0.15 mm in range with respect to the raceway member 2 when cut along the direction perpendicular to the axial direction of the raceway member 2 in the state attached to the moving member 3.

Figure 5A:
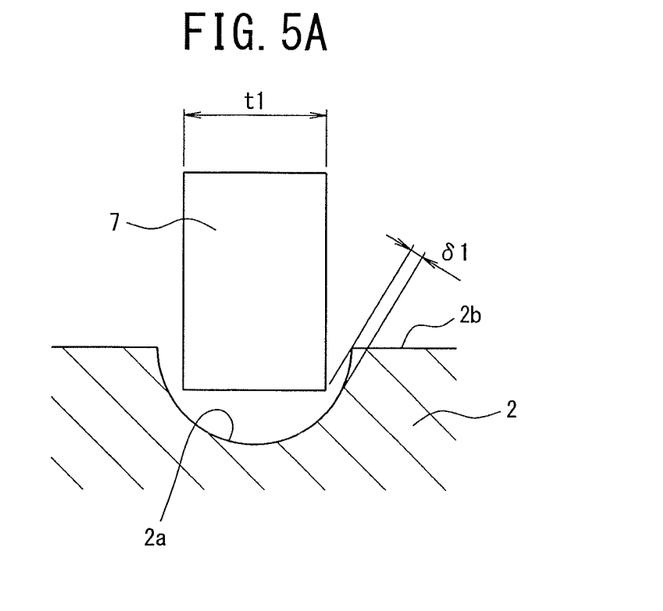
Figure 5B:
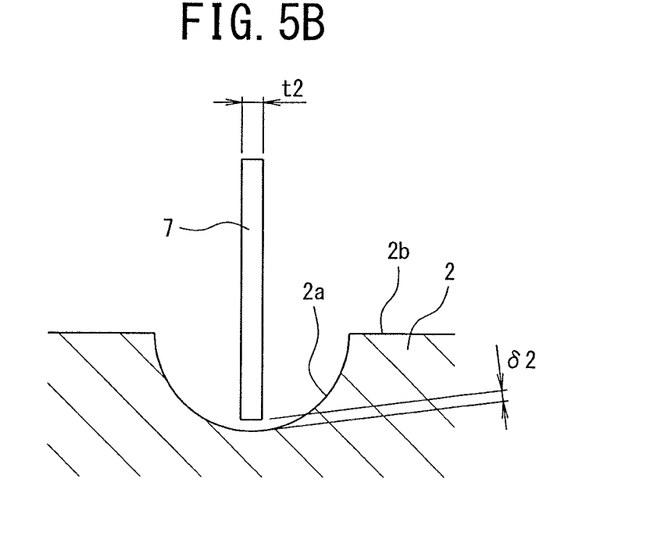

Next, the thickness "t" (see FIG. 3) of the seal members 7 along the axial direction of the raceway member 2 will be explained with reference to FIG. 5. FIG. 5 shows the difference in the amount of clearance between the seal members and the raceway member due to differences in thickness of the seal members, wherein (A) is a schematic view of the case where the seal members are thick and (B) is a schematic view of the case where the seal members are thin.

In FIG. 5(A) and FIG. 5(B), the rolling element rolling part (rolling element rolling groove) 2a of the raceway member 2 is shaped comprised by two arcs with curvature which are connected together. The two arcs are connected at the groove bottom. If making the thickness "t" of the seal members 7 thicker to t1 as shown in FIG. 5(A), to avoid contact between the seal members 7 and the rolling element rolling part 2a, the distance between the seal members 7 and the groove bottom becomes longer and the amount of clearance between the seal members 7 and the raceway member 2 becomes larger at $\delta$1. On the other hand, if making the thickness "t" of the seal members thinner to t2 as shown in FIG. 5(B), working the seal members 7 becomes difficult, the rigidity becomes weak, and the sealing ability becomes unstable. For this reason, the thickness "t" of the seal members 7 was made 0.1 mm to less than 1.2 mm. Due to this, when making the linear device 1 a ball screw and making the raceway member 2 a threaded shaft, the clearance between the seal members and the groove bottom of the threaded shaft can be maintained at the suitable size, working of the seal members is easy, a suitable rigidity is secured, and the sealing ability is also stable. If the thickness "t" of the seal members 7 is greater than 1.2 mm, the clearance between the seal members and the groove bottom of the threaded shaft ends up becoming larger than 0.15 mm. On the other hand, if the thickness "t" of the seal members 7 is less than 0.1 mm, working of the seal members becomes difficult, the rigidity ends up dropping, and the sealing ability is unstable.

Further, for the material of the seal members 7, polyacetal or other resin material or a metal material which is superior in mechanical strength, heat resistance, wear resistance, chemical resistance, machineability, and cost is used. The material of the seal member 7 is preferably one which is superior in non-absorbency and dimensional stability.

Figure 6A:
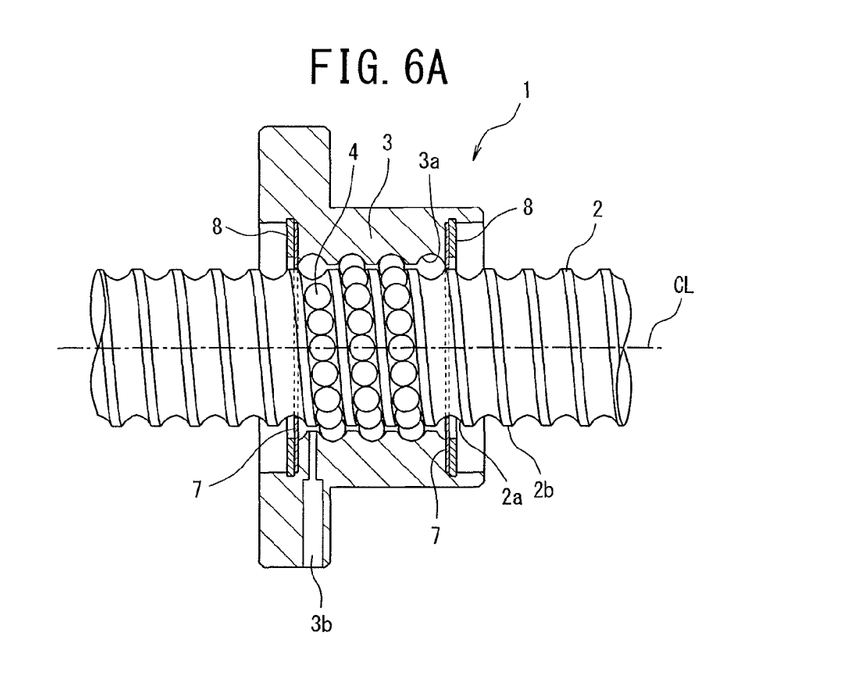
Figure 6B:
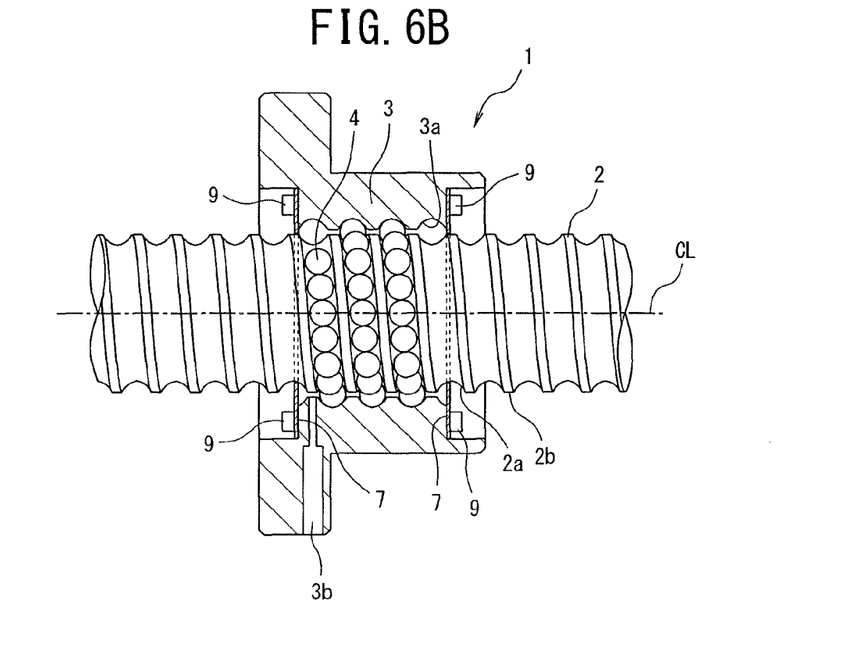

Next, the method of attaching the seal members 7 to the moving member 3 will be explained with reference to FIG. 6. FIG. 6 shows a method of attachment of the seal members, wherein (A) is a cross-sectional view of the case of attaching the seal members by circlips and (B) is a cross-sectional view of the case of attaching the seal members to the moving member by setscrews.

As shown in FIG. 6(A) and FIG. 6(B), a pair of seal members 7 are attached to the two ends of the moving member 3 in the axial direction. The seal members 7 are fastened by circlips 8 to the end parts of the moving member 3 in the axial direction as shown in FIG. 6(A) or are fastened by a plurality of setscrews 9 as shown in FIG. 6(B).

Above, an embodiment of the present invention was explained, but the present invention is not limited to this. Various changes and improvements may be made.

For example, as the linear device 1, the invention may be applied to not only a ball screw, but also a linear guide, ball spline, etc. When applying it to a linear guide, the raceway member is made a guide rail and the moving member is made a slider. Further, when applying it to a ball spline, the raceway member used is made a cylindrically shaped raceway member and the moving member is made a ball spline nut.

Further, an example where each of the pair of seal members 7 was comprised of a single seal member was explained, but the invention is not limited to this. Each of the pair of seal members 7 may also be comprised of a plurality of seal members, and the plurality of seal members may be arranged along the axial direction of the moving member 2 at a pitch which gives a clearance of at least the thickness of the seal members. In this case, the amount of fine particles which are produced between the rolling element raceway 5 and the rolling elements 4 which lead to outside of the device can be suppressed more.

REFERENCE SIGNS LIST 1 linear device
2 raceway member
2a rolling element rolling part
2b outer circumference of raceway member
3 moving member
3a load rolling element rolling part
3b greasing hole
4 rolling element
5 rolling element raceway
6 rolling element recirculation path
6a recirculation path
6b scooping member
6c passage
7 seal member
7a through hole
8 circlip
9 setscrew
$\delta$ clearance
t thickness of seal member
G grease layer

The invention claimed is:

1. A linear device comprising a raceway member which extends in an axial direction and which has a rolling element rolling part on its outer circumferential surface, a moving member which has a load rolling element rolling part which faces the rolling element rolling part on its inner circumferential surface and which can move relative to the raceway member, a plurality of rolling elements which are loaded rollably inside a rolling element raceway which is formed by the rolling element rolling part and the load rolling element rolling part, a rolling element recirculation path which connects a starting point and end point of the rolling element raceway to form an endless rolling element passage, and a pair of seal members which are respectively attached to two ends of the moving member in the axial direction, wherein each of the seal members is formed to a shape having a clearance of 0.025 to 0.15 mm with respect to the raceway member when cut along a direction perpendicular to the axial direction of the raceway member in a state attached to the moving member and wherein grease with a worked penetration of 175 to 250 is coated between the rolling element raceway and the rolling elements such that a respective grease layer is formed between the raceway member and the seal members to result in the clearance between the seal members and the raceway member becoming smaller by an amount of the grease layer, wherein a material of each of the seal members is made of a metal material, wherein the rolling element rolling part is a rolling element rolling groove formed on the outer circumferential surface of the raceway member, and wherein the clearance is defined as the geometrically smallest distance between a surface of the rolling element rolling grove to one of a plurality of corners of a tip of each respective one of the pair of seal members.

2. The linear device according to claim 1, wherein each of the seal members along the axial direction of the raceway member has a thickness of 0.1 mm to less than 1.2 mm.

* * * * *